(12) United States Patent
Lee et al.

(10) Patent No.: US 9,906,944 B2
(45) Date of Patent: Feb. 27, 2018

(54) DEVICE AND METHOD FOR SUBSCRIBING TO NETWORK IN WIRELESS COMMUNICATION SYSTEM

(71) Applicant: Samsung Electronics Co., Ltd., Gyeonggi-do (KR)

(72) Inventors: Duckey Lee, Seoul (KR); Bo-Gyeong Kang, Seoul (KR); Jung-Je Son, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 58 days.

(21) Appl. No.: 14/668,264

(22) Filed: Mar. 25, 2015

(65) Prior Publication Data

US 2015/0281942 A1 Oct. 1, 2015

(30) Foreign Application Priority Data

Mar. 25, 2014 (KR) ........................ 10-2014-0034738

(51) Int. Cl.
| | |
|---|---|
| *H04W 4/00* | (2009.01) |
| *H04W 8/20* | (2009.01) |
| *H04W 48/16* | (2009.01) |
| *H04W 8/18* | (2009.01) |

(52) U.S. Cl.
CPC .......... *H04W 8/205* (2013.01); *H04W 48/16* (2013.01); *H04W 8/183* (2013.01)

(58) Field of Classification Search
None
See application file for complete search history.

(56) References Cited

U.S. PATENT DOCUMENTS

| | | | | |
|---|---|---|---|---|
| 2006/0114870 A1* | 6/2006 | Buckley | ............. | H04W 76/021 370/338 |
| 2008/0261655 A1* | 10/2008 | Carpenter | ............ | H04W 48/18 455/558 |

(Continued)

FOREIGN PATENT DOCUMENTS

| | | |
|---|---|---|
| KR | 10-2014-0140820 | 12/2014 |
| KR | 10-2014-0140882 | 12/2014 |

OTHER PUBLICATIONS

Smart Cards; Embedded UICC; Technical Specification (Release 12), ETSI TS 103 384 V0.6.0, Mar. 24, 2014.

(Continued)

*Primary Examiner* — Shantell L Heiber
(74) *Attorney, Agent, or Firm* — The Farrell Law Firm, P.C.

(57) ABSTRACT

A terminal device and a method of operating the terminal in a wireless communication system are provided. The terminal device includes a controller configured to search for an accessible network and acquire information for providing identification information of an embedded Universal Integrated Circuit Card (eUICC) to a network provider of a network selected by a user; and a communication unit configured to transmit the acquired information to the network provider. The method includes searching for an accessible network and acquiring information for providing identification information of an embedded Universal Integrated Circuit Card (eUICC) to a network provider of a network selected by a user; and transmitting the acquired information to the network provider.

18 Claims, 7 Drawing Sheets

(56) References Cited

U.S. PATENT DOCUMENTS

| | | | |
|---|---|---|---|
| 2009/0116441 A1* | 5/2009 | Park | H04W 48/18 370/329 |
| 2012/0108207 A1* | 5/2012 | Schell | H04L 63/0853 455/411 |
| 2013/0066633 A1* | 3/2013 | Krishnan | G06F 17/30876 704/270.1 |
| 2014/0004854 A1* | 1/2014 | Veran | H04W 48/18 455/432.1 |
| 2014/0031012 A1* | 1/2014 | Park | H04W 12/06 455/411 |
| 2014/0357229 A1 | 12/2014 | Lee et al. | |
| 2015/0119029 A1* | 4/2015 | Scribano | H04W 48/18 455/434 |
| 2015/0181419 A1* | 6/2015 | Mistry | H04W 8/18 455/419 |

OTHER PUBLICATIONS

Smart Cards; Embedded UICC; Requirements Specification (Release 12), ETSI TS 103 383 V12.3.0, Feb. 1, 2014.
Samsung, EUICC Profile Provisioning Procedure, ETSI Draft; Jun. 4, 2013, 6 pages.
Smart Cards; Card Application Toolkit (CAT); (Release 11), ETSI TS 102 223 V11.2.0, Dec. 7, 2013, 233 pages.
European Search Report dated Aug. 17, 2015 issued in counterpart application No. 15160621.7-1854, 12 pages.

* cited by examiner

DEVICE AND METHOD FOR SUBSCRIBING TO NETWORK IN WIRELESS COMMUNICATION SYSTEM

PRIORITY

This application claims priority under 35 U.S.C. § 119(a) to a Korean Patent Application filed on Mar. 25, 2014 in the Korean Intellectual Property Office and assigned Serial No. 10-2014-0034738, the entire contents of which are incorporated herein by reference.

BACKGROUND

1. Field of the Invention

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The present invention relates generally to a device and method for subscribing to a network in a wireless communication system, and more particularly, to a device and method for automatically transferring an embedded Universal Integrated Circuit Card IDentifier (eUICC ID) value of a terminal to a network provider subscription server in a wireless communication system.

2. Description of the Related Art

A Universal Integrated Circuit Card (UICC) that inserts into and is used in a mobile communication terminal as a smart card. The UICC stores personal information of a mobile communication subscriber and enables safe use of mobile communication by performing subscriber authentication and generation of a traffic security key when accessing a mobile communication network.

The UICC is produced as an exclusive card for a corresponding provider by a request of a mobile communication provider, and when producing a card, authentication information, for example, a Universal Subscriber Identity Module (USIM) application, an International Mobile Subscriber Identity (IMSI), and a K value, for access to a network of the corresponding provider is previously mounted in the card, and the card is launched. Therefore, a corresponding mobile communication provider receives delivery of the produced UICC card to provide the UICC card to a subscriber, and the subscriber performs management such as installation, adjustment, and deletion of an application within the UICC using technology such as Over The Air (OTA), as needed. The subscriber may insert the UICC card into a mobile communication terminal and use the UICC card in a network and an application service of a corresponding mobile communication provider. When replacing the terminal, by inserting the UICC card from an existing terminal to a new terminal, the subscriber may use authentication information, a mobile communication phone number, and a personal phonebook stored in the UICC card in the new terminal.

The UICC card has a physical shape and a logical function defined by a standardization organization of the European Telecommunications Standards Institute (ETSI) and maintains international compatibility. With regard to form factor, the UICC card comes in gradually reduced sizes from the most widely used Mini SIM to a Micro SIM and to a recent Nano SIM. Thereby, the UICC card contributes much to reducing the size of a mobile communication terminal, but it is difficult to standardize a UICC card of a size smaller than the recently produced Nano SIM due to the possibility of loss by a user, and in view of a detachable UICC card, a space for mounting a detachable slot to the terminal is required and thus it is difficult to form a detachable UICC card in a smaller size.

In order to solve such a problem, when producing a mobile communication terminal, a security module that performs a function similar to the UICC is housed in the terminal and it is requested that the security module replace the UICC. Therefore, an embedded UICC structure which cannot be detached is suggested.

An embedded UICC (eUICC) may be mounted in a Machine-to-Machine (M2M) device requiring access to a mobile communication data network without a person's direct manipulation in various installation environments such as an intelligent household product, an electricity/water supply meter, and a Closed Circuit TeleVision (CCTV) camera. Further, recently, it is suggested to apply the eUICC to a user terminal. However, at present, a network subscription procedure for a user terminal having the eUICC is not suggested. Therefore, an alternative for a network subscription for a user terminal having the eUICC is needed.

SUMMARY

The present invention has been made to provide at least the advantages described below.

Accordingly, an aspect of the present invention is to provide a device and method for searching for a list of available network providers in a nation in which a terminal user is located in a wireless communication system and selecting and subscribing to one of the network providers.

Another aspect of the present invention is to provide a device and method for automatically transferring an embedded Universal Integrated Circuit Card IDentifier (eUICC ID) value of a terminal to a network provider subscription server in a wireless communication system.

Another aspect of the present invention is to provide a device and method for automatically downloading and installing a profile when a user completes a subscription to a network in a wireless communication system.

In accordance with an aspect of the present invention, a terminal device in a wireless communication system is provided. The terminal device includes a controller configured to search for an accessible network and acquire information for providing identification information of an eUICC to a network provider of a network selected by a user; and a communication unit configured to transmit the acquired information to the network provider.

In accordance with another aspect of the present invention, a network subscription server device in a wireless communication system is provided. The network subscription server device includes a communication unit configured to receive, from a terminal, at least one of identification information of an eUICC of the terminal, identification information of the terminal, a profile manager address, subscriber information, and an acknowledgment (ACK); and a controller that controls the terminal to subscribe to a network through the subscriber information and that controls to transfer the acknowledgment to the terminal.

In accordance with another aspect of the present invention, a profile provider device in a wireless communication system is provided. The profile provider device includes a communication unit configured to receive, from a network subscriber, at least one of identification information of an eUICC, identification information of a terminal, a profile manager address, and subscriber information; and a controller configured to control to transfer at least one of the identification information of the eUICC and the identification information of the terminal to a profile manager.

In accordance with another aspect of the present invention, a profile manager device in a wireless communication system is provided. The profile manager device includes a communication unit configured to transmit and receive at least one of identification information of an eUICC from a profile provider, identification information of a terminal, and an acknowledgment; and a controller configured to determine an eUICC corresponding to identification information of the eUICC and identification information of the terminal and generate a secure channel and control to transmit a profile to the eUICC, when a profile transmission request message is received from the eUICC.

In accordance with another aspect of the present invention, a method of operating a terminal in a wireless communication system is provided. The method includes searching for an accessible network and acquiring information for providing identification information of an eUICC to a network provider of a network selected by a user; and transmitting the acquired information to the network provider.

In accordance with another aspect of the present invention, a method of operating a network subscription server in a wireless communication system is provided. The method includes receiving, from a terminal, at least one of identification information of an eUICC, identification information of the terminal, a profile manager address, and subscriber information; and enabling the terminal to subscribe to a network based on the subscriber information.

In accordance with another aspect of the present invention, a method of operating a profile provider in a wireless communication system is provided. The method includes receiving, from a network subscriber server, at least one of identification information of an eUICC, identification information of a terminal, a profile manager address, and subscriber information; and transferring at least one of identification information of the eUICC and identification information of the terminal to a profile manager.

In accordance with another aspect of the present invention, a method of operating a profile manager in a wireless communication system is provided. The method includes receiving, from a profile provider, at least one of identification information of an eUICC and identification information of a terminal; determining an eUICC corresponding to the identification information of the eUICC and identification information of the terminal; and generating a secure channel and transmitting a profile to the eUICC, when a profile transmission request message is received from the eUICC.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Hereinafter, an operation principle of the present invention is described in detail with reference to the accompanying drawings.

Detailed descriptions of well-known functions and structures incorporated herein are omitted to avoid obscuring the subject matter of the present invention. The terms used herein are defined according to the functions of the present invention and may vary depending on a user's or an operator's intension and usage. Therefore, the terms used herein should be understood based on the descriptions made herein.

Hereinafter, a device and method for subscribing to a network in a wireless communication system according to an embodiment of the present invention are described.

Figure 1:
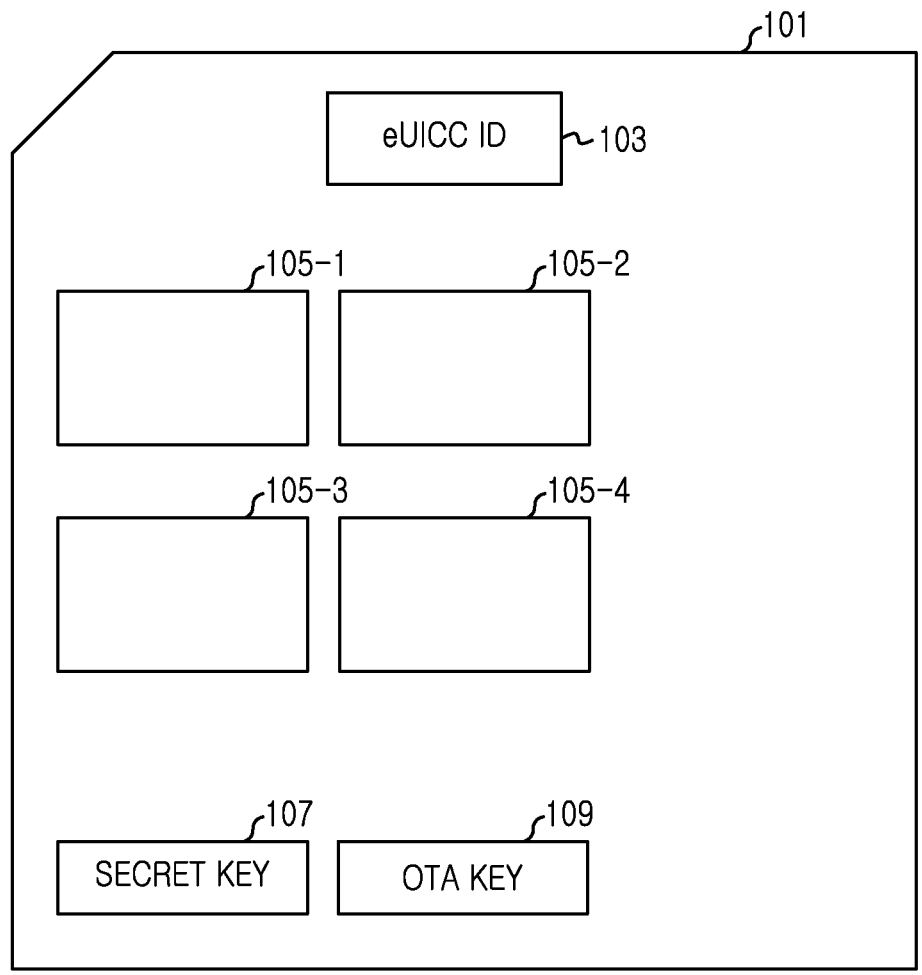
FIG. 1 is a block diagram illustrating an eUICC in a wireless communication system according to an embodiment of the present invention.

FIG. 1 is a block diagram of an embedded Universal Integrated Circuit Card (eUICC) in a wireless communication system according to an embodiment of the present invention.

Referring to FIG. 1, an eUICC 101 stores an eUICC IDentifier (eUICC ID) 103, a secret key 107, an OTA key 109, and includes a plurality of storage spaces 105-1 to 105-4. The eUICC ID 103 is intrinsic identification information of the eUICC 101, and when a user subscribes to a network provider, the eUICC ID 103 is transferred to the network provider. The security key 107 is an encryption key of the eUICC 101 that is used when encoding a profile and transferring the encoded profile to the eUICC 101. The OTA key 109 is a eUICC management key used for secondarily encoding the eUICC profile.

The storage spaces 105-1 to 105-4 store a profile, and the profile contains information included in an UICC. For example, the profile may include Universal Integrated Circuit Card IDentifier (UICCID) information, Universal Subscriber Identity Module (USIM) information, and banking information. As a profile generated by a network provider is stored and activated at any one of the storage spaces 105-1 to 105-4, the eUICC may perform a function as a eUICC of the network provider.

In FIG. 1, four storage spaces 105-1 to 105-4 are illustrated. However, according to another embodiment of the present invention, the eUICC 101 may include three storage spaces or less or five storage spaces or more.

Figure 2:
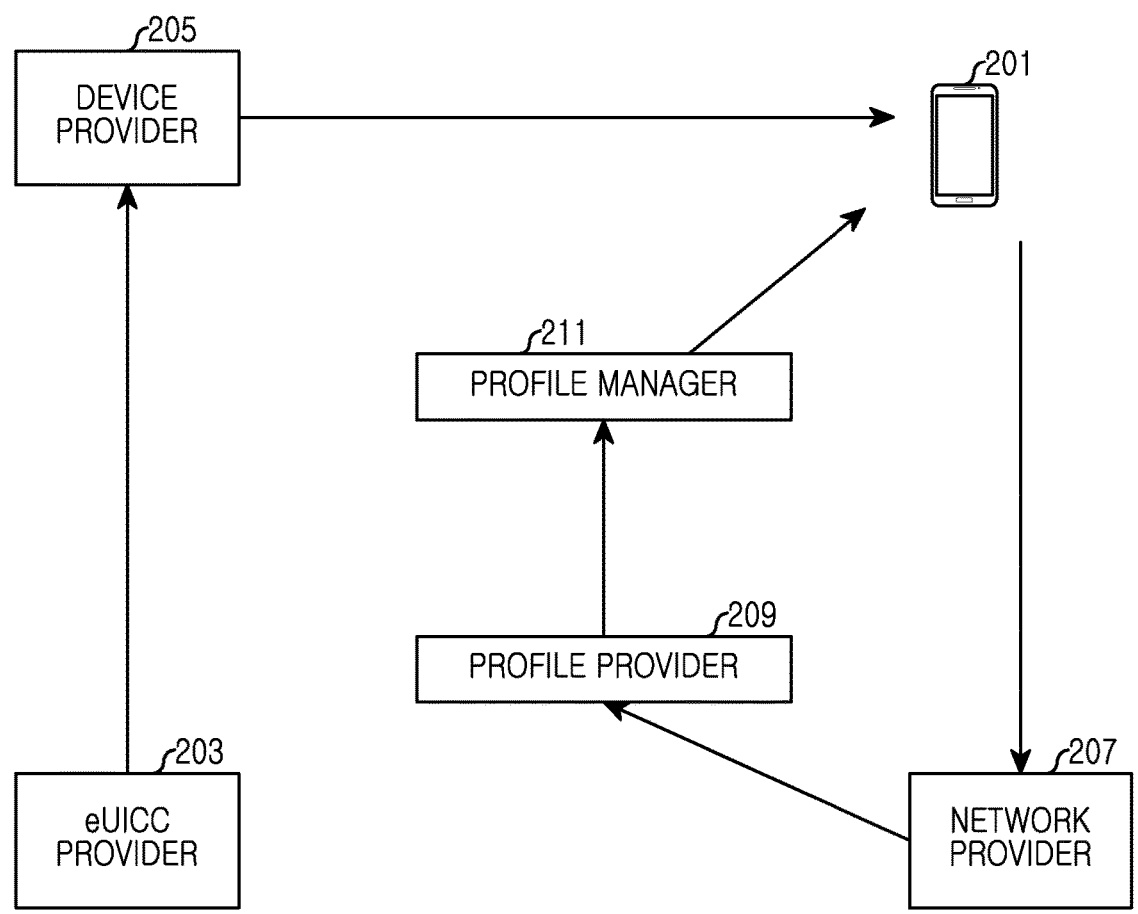
FIG. 2 is a block diagram illustrating a network subscription procedure in a wireless communication system according to an embodiment of the present invention.

FIG. 2 is a block diagram illustrating a network subscription procedure in a wireless communication system according to an embodiment of the present invention.

Referring to FIG. 2, a eUICC provider 203 is a provider of embedded software such as an eUICC module, firmware, and an operating system. A device provider 205 includes a modem function through a communication network driven by a network provider and is a provider of a device that houses an eUICC. A network provider 207 is a communication provider that provides a communication service to a customer through a communication network. A profile provider 209 performs safe generation of a package or a profile to be transferred to the eUICC and operates together with a Profile Manager (PM) 211 for actual transmission. The PM 211 performs a function of safely routing and transferring a profile package to a corresponding eUICC.

The eUICC provider 203 supplies an eUICC integrated circuit or chip to the device provider 205. The device provider 205 houses the eUICC chip received through the eUICC provider 203 in a terminal and supplies a terminal in which the eUICC chip is housed to a user. The user, having received the terminal requests to subscribe to the network provider 207 through the terminal. When the user requests to subscribe to the network provider, the network provider 207 transfers Universal Subscriber Identity Module (USIM) information such as an International Mobile Subscriber Identity (IMSI) and a value K to the profile provider 209. The IMSI is a subscriber identification number, and a structure thereof is formed with a combination of a Mobile Country Code (MCC), a Mobile Network Code (MNC), and a phone number. The MCC is a national code, and the MNC is a network provider code. A Universal Subscriber Identity Module (USIM) is a module in card form that can be used in a mobile phone and stores personal information so as to provide various services such as authentication, fee charging and a security function to a subscriber.

The profile provider 209 packages UICC information in a profile form, encodes the profile, and transfers the encoded profile to the PM 211. The PM 211 transfers the profile to a terminal 201 with an Over The Air (OTA) method, and the terminal installs the profile.

According to the above-described method, a user can directly find a subscription channel of a network provider to subscribe in a network provider list and perform a subscription procedure. Further, when a user subscribes to a network, in a process of directly notifying the network provider of an eUICC ID, an error may occur. Further, there is a problem that the user cannot download and install a profile immediately when the user subscribes to a network.

Therefore, hereinafter, the present invention suggests a network subscription procedure for solving problems occurring when a subscriber directly performs a subscription procedure. Specifically, in an embodiment of the present invention, a network subscription procedure for finding an available network provider list in a nation or a region in which a user is located when the user subscribes to a network and solving inconvenience in which a customer should directly find and subscribe a subscription channel of a network provider to subscribe in the network provider list, a network subscription procedure for reducing an error occurring in a process of directly notifying the network provider of an eUICC ID when the user subscribes to the network, and a network subscription procedure for downloading and installing a profile immediately when the user subscribes to the network are described below.

Figure 3:
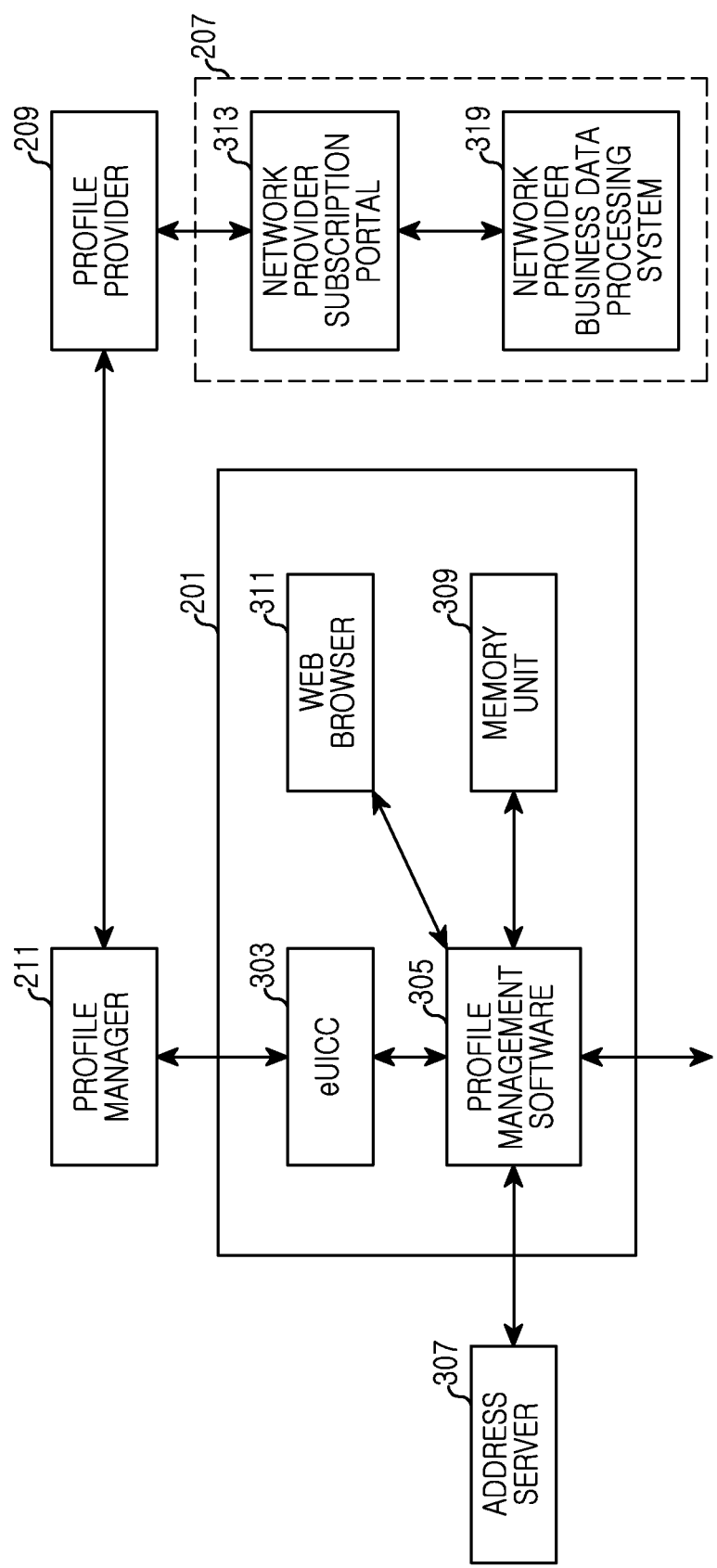
FIG. 3 is a block diagram illustrating network entities for a network subscription procedure in a wireless communication system according to an embodiment of the present invention.

FIG. 3 is a block diagram of network entities for a network subscription procedure in a wireless communication system according to an embodiment of the present invention.

Referring to FIG. 3, a terminal 301 includes an eUICC 303, profile management software 305, a memory unit 309, and a web browser 311. The profile management software 305 controls a network subscription procedure of a user of the terminal 301. The memory unit 309 is a means for storing data. For example, the memory unit 309 may store Public Land Mobile Network IDentifiers (PLMN IDs) and Uniform Resource Locator (URL) information of network providers. The web browser 311 is an application program that searches for information in an Internet network, transmits information through the Internet network, and receives information through the Internet network. The web browser 311 may access a network provider subscription portal 313 according to the control of the profile management software 305 and provide functions for transmitting subscription related information to the network provider subscription portal 313.

An address server 307 is a server that stores PLMN IDs and URLs of network providers in which the terminal may subscribe. The network provider subscription portal 313 is an Internet site that provides a service in which the user can subscribe to a network provider. The network provider subscription portal 313 is operated by a network provider and may be provided by a server in which the network provider operates. In this case, a server which a network provider uses for operating the network provider subscription portal 313 may be referred to as a "network subscription server." A PM 315 performs a function of safely routing and transferring a profile package to a corresponding eUICC. A profile provider 317 performs safe generation of a package or a profile to be transferred to the eUICC and operates together with the PM 315 for actual transmission. A network provider business data processing system 319 is connected to the network provider subscription portal 313 to perform various business activity necessary when a user subscribes to a network. The network provider subscription portal 313 and the network provider business data processing system 319 may be operated in the network provider 207 in FIG. 2.

Figure 4:
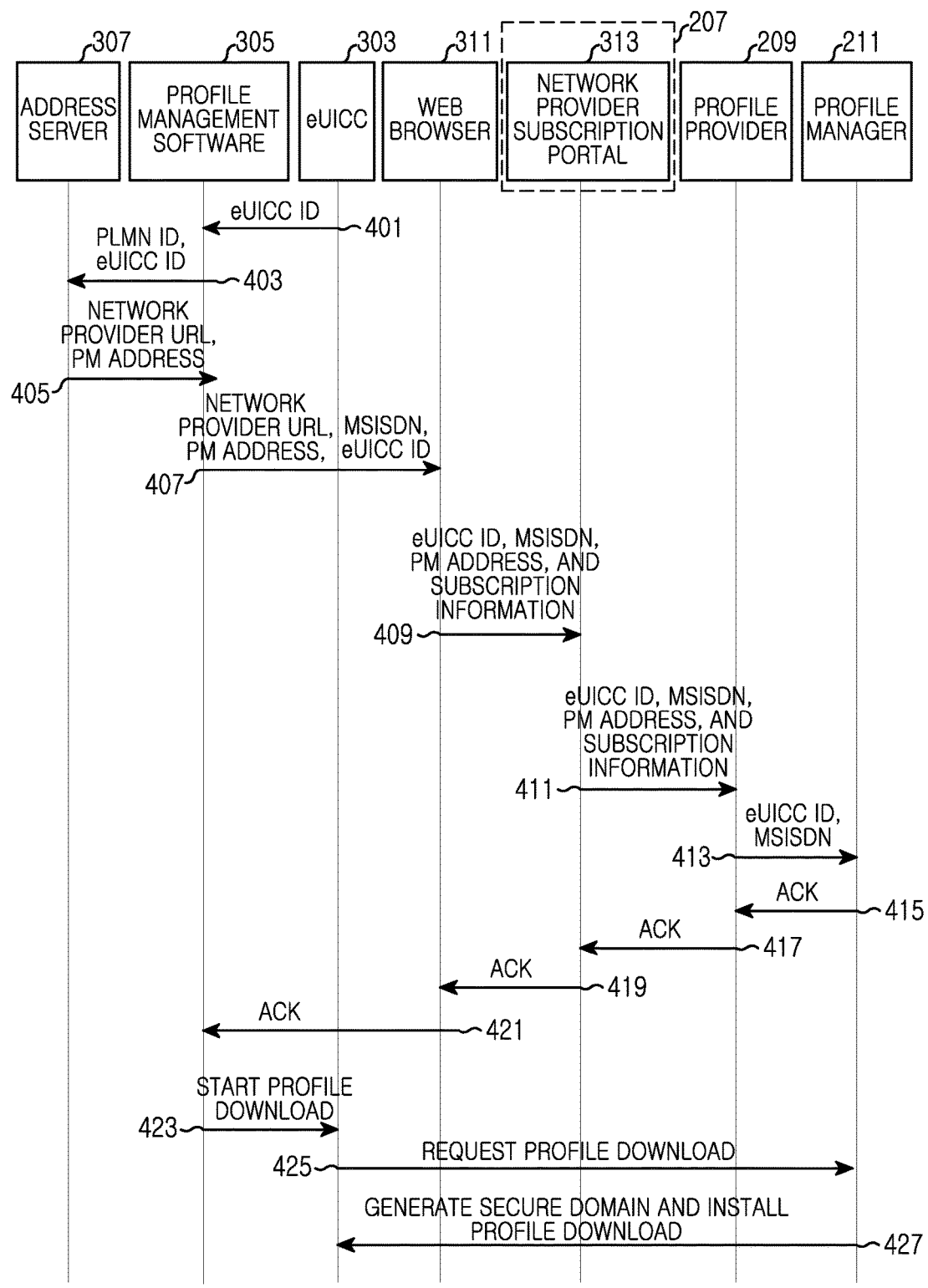
FIG. 4 is a message flow diagram illustrating signal exchange for a network subscription in a wireless communication system according to an embodiment of the present invention.

FIG. 4 is a message flow diagram illustrating signal exchange for a network subscription in a wireless communication system according to an embodiment of the present invention. In FIG. 4, the eUICC 303, the profile management software 305, the address server 307, and the web browser 311 are elements of a terminal.

Referring to FIG. 4, the eUICC 303 transfers an eUICC ID value stored in the eUICC 303 to the profile management software 305 in step 401. In this case, the eUICC 303 may additionally transfer information such as a Mobile Subscriber Integrated Services Digital Network (ISDN) Number (MSISDN), an address server address, and a PM address to the profile management software 305. The MSISDN is a terminal international number allocated to a terminal and is used as a transmitting and receiving number of a call and a Short Message Service (SMS). The PLMN ID includes an MCC and an MNC.

According to an embodiment of the present invention, the PM address may be acquired from the address server 307 instead of the eUICC 303. The profile management software 305 transfers the eUICC ID value acquired from the eUICC 303 to the address server 307, and the address server 307 transfers a PM address corresponding to the eUICC ID value to the profile management software 305. In this case, the eUICC 303 may omit the PM address in an information set that is transferred to the profile management software 305.

The profile management software 305 displays a PLMN ID list and a network provider list corresponding to each PLMN ID value acquired through scanning of a Radio Frequency (RF) and enables selection of a network provider in which a user wants to subscribe in step 403. The profile management software 305 transfers a PLMN ID value of a network provider selected by the user to the address server 307. RF scanning is a procedure for searching for networks in which the terminal can use in a nation or a city at which the user is located. RF scanning may be performed while in a nation or when roaming overseas.

The profile management software 305 acquires at least one of a network provider URL and PM address through the address server 307 in step 405. The address server 307 stores URLs of network providers corresponding to each of a plurality of PLMN IDs. Therefore, the address server 307 searches for a network provider URL corresponding to the PLMN ID provided from the profile management software 305 and transfers the found network provider URL to the profile management software 305.

According to an embodiment of the present invention, the network provider URL may be acquired from a memory of the terminal instead of the address server 307. In this case, steps 403 and 405 may be omitted. The memory may transfer the network provider URL to the profile management software 305. The memory stores URLs of network providers corresponding to each of a plurality of PLMN IDs. Therefore, the memory may search for a corresponding network provider URL using the PLMN ID provided from the profile management software 305.

When the user selects a network provider through the profile management software 305, the profile management software 305 transfers the selected network provider URL to the web browser 311 in step 407 and prepares to access the selected network provider through the web browser 311. Simultaneously, the profile management software transfers at least one of the PM address, the MSISDN, and the eUICC ID to the web browser 311. When the user subscribes to a communication service in which the network provider provides through the web browser 311, the web browser 311 provides the eUICC ID, the MSISDN, and the PM address to the network manager subscription portal 313 in step 409.

The network manager subscription portal 313 accesses the profile provider 317 through the PM address and transfers the PM address, the eUICC ID, the MSISDN, and the subscription information to the profile provider 209 in step 411. The profile provider 317 transfers the eUICC ID and the MSISDN to the PM 315 in step 413. The PM 315 transfers an ACKnowledgment (ACK) to the profile provider 317 in step 415. The profile provider 317 transfers the acknowledgment to the network provider subscription portal 313 in step 417. The network manager subscription portal 313 transfers the acknowledgment to the web browser 311 in step 419.

The web browser 311 transfers the acknowledgment to the profile management software 305 in step 421. The profile management software 305 enables a profile download start message to transfer to the eUICC 303 in step 423. The eUICC 303 transfers a profile download request signal to the PM 315 in step 425. The PM 315 provides a profile to the eUICC 303 in step 427. In this case, for security of the profile transfer, the PM 315 sets a secure channel and transfers the secure channel to the eUICC 303. The eUICC 303 completes installation of the profile.

Figure 5:
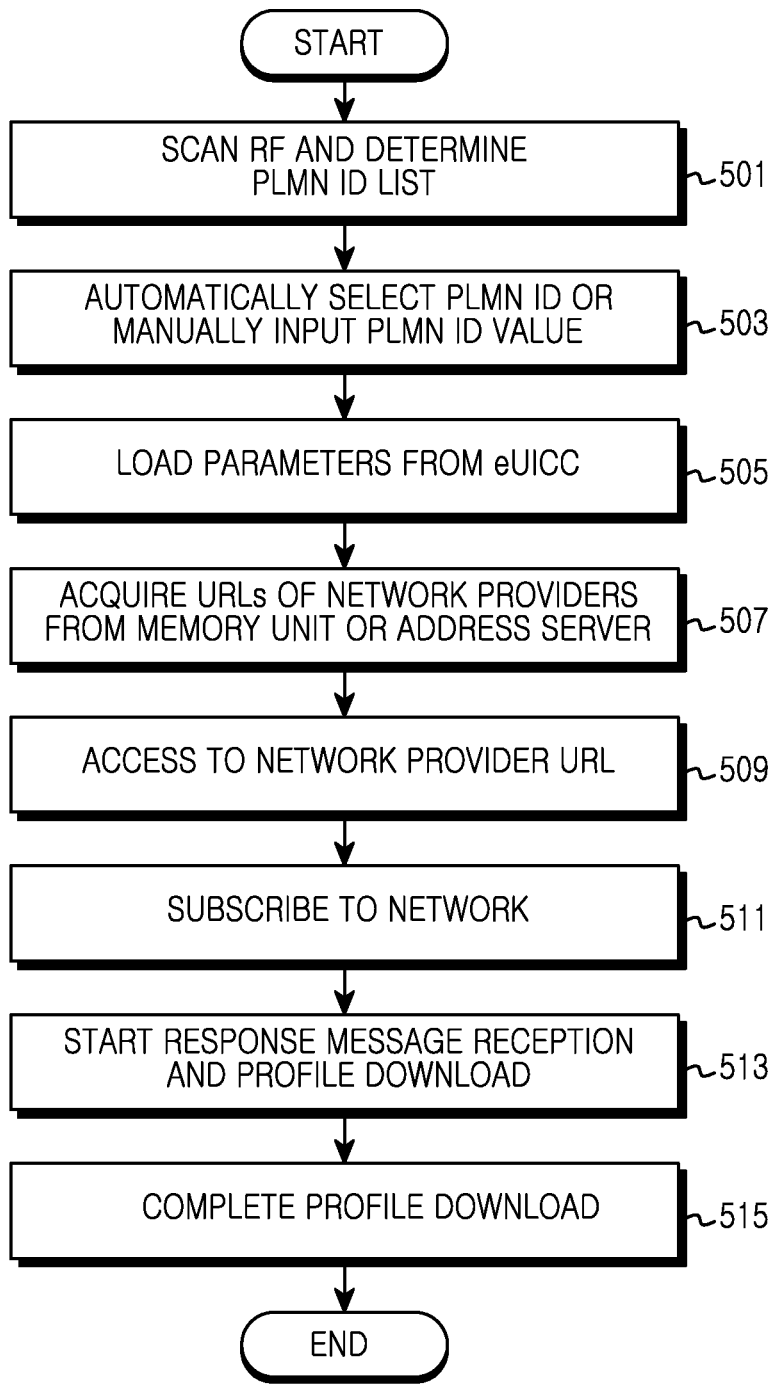
FIG. 5 is a flowchart illustrating a network subscription procedure of a terminal in a wireless communication system according to an embodiment of the present invention.

FIG. 5 is a flowchart illustrating a network subscription procedure of a terminal 201 in a wireless communication system according to an embodiment of the present invention.

Referring to FIG. 5, the terminal 201 scans an RF and determines a PLMN ID list in step 501. The terminal 201 may search for available network providers at a located nation or city through RF scanning. Particularly, upon performing overseas roaming, the terminal 201 may search for network providers of a region in which the user is located.

The terminal 201 automatically selects a PLMN ID through a preset algorithm or receives a manual input of a PLMN ID by the user through profile management software in step 503.

The terminal 201 loads parameters from the eUICC in step 505. The parameters include an eUICC ID, an activated MSISDN, an address server address, and a PM address.

The terminal 201 acquires URLs of network providers from a memory unit or an address server in step 507. The terminal 201 acquires URLs of network providers from a database or the address server through the automatically or manually input PLMN ID and transfers the acquired URLs to the profile management software. In this case, when the terminal 201 does not acquire the PM address from the eUICC, the terminal 201 receives a PM address from the address server.

The terminal 201 accesses the network provider URL selected by the user in step 509. The user selects a network provider that the user wants to use from a list of network providers provided through profile management software of the terminal 201. When the user selects a network provider that the user wants to use through the profile management software, the terminal 201 accesses the selected network provider subscription portal through a web browser thereof.

The terminal 201 subscribes to the network in step 511. The user may subscribe to a communication service of the network provider selected by the user through a web browser of the terminal 201. When the subscription is complete, the eUICC ID, the MSISDN, and the PM address are transferred to the network provider portal through the web browser. Subscriber information together with the eUICC ID, the MSISDN, and the PM address are transferred from the network provider portal to the profile provider. The eUICC ID and the MSISDN are transferred to a PM.

The terminal 201 starts response message reception and profile download in step 513. When the eUICC ID and the MSISDN are transferred to the PM, the PM transfers a response message. The response message is transferred to profile management software of the terminal 201 through the profile provider, the network provider portal, and the web browser of the terminal 201.

The profile management software, having received the response message transfers a profile download start message to the eUICC. When the eUICC receives the profile download start message, the terminal 201 transmits a profile download request message to the PM. The terminal 201 completes profile download in step 515.

Figure 6:
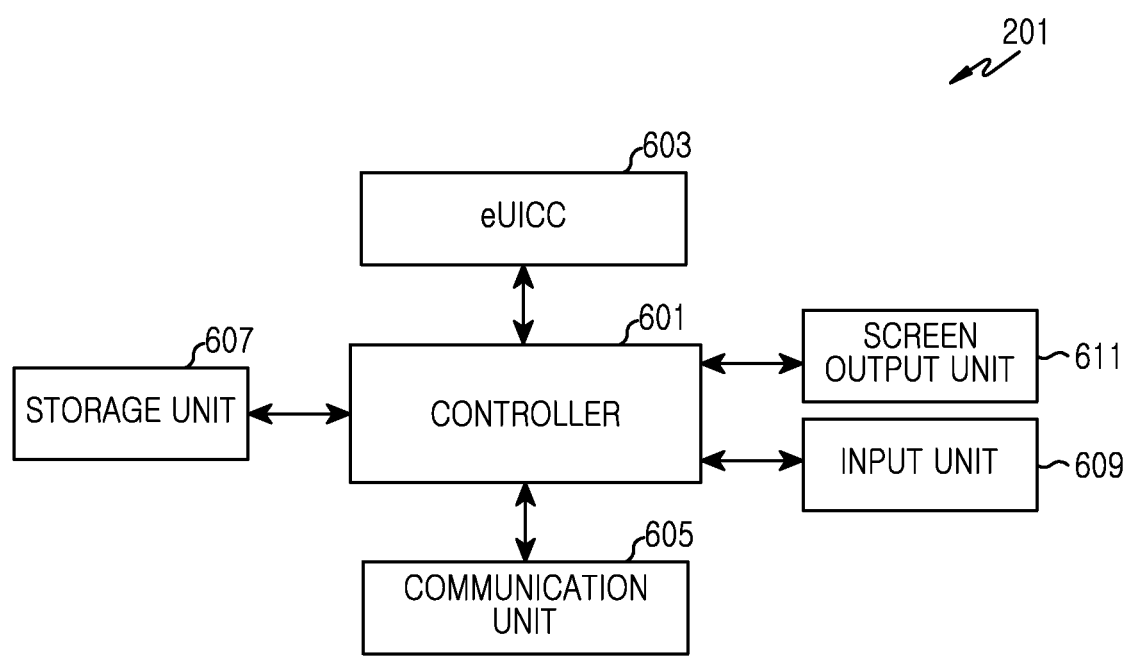
FIG. 6 is a block diagram illustrating a terminal for a network subscription procedure in a wireless communication system according to an embodiment of the present invention.

FIG. 6 is a block diagram illustrating a terminal 201 for a network subscription procedure in a wireless communication system according to an embodiment of the present invention.

Referring to FIG. 6, the terminal 201 includes a controller 601, an eUICC 603, a communication unit 605, a storage unit 607, an input unit 609, and a screen output unit 611.

The controller 601 controls an entire operation of the terminal 201. The eUICC 603 is a smart card that is housed and used in the terminal 201 and stores personal information such as network access authentication information, a phonebook, and a Short Message Service (SMS) of a user, and when accessing a wireless communication network, the eUICC 603 performs subscriber authentication and generates a traffic security key. The storage unit 607 includes a program storage unit that stores a program for controlling the operation of the terminal 201 and a data storage unit that stores data occurring while executing a program. For example, the storage unit 607 may store URLs of network providers in which the user wants to subscribe. The communication unit 605 processes a signal transmitted and received through an antenna for audio and data communication. The screen output unit 611 displays state information of the terminal 201, a character, a moving picture, and a still picture in which the user inputs according to the control of the controller 601. For example, the screen output unit 611 displays a screen of a network provider subscription portal that can subscribe to a network to the user according to the control of the controller 601. The input unit 609 provides input data occurring by selection of the user to the controller. For example, when the screen output unit 611 is formed in a touch screen, the input unit 609 includes only a control button for the control of the terminal 201. For another example, the input unit 609 may be formed in a keypad for receiving input data from the user.

According to an embodiment of the present invention, the controller 601 controls to search for an accessible network, acquire information for providing identification information of an eUICC to a network provider of a network selected by the user, and receive a profile from a PM that received the identification information through a network subscription server.

According to an embodiment of the present invention, the controller 601 controls to transfer information such as an eUICC ID, an MSISDN, an address server address, and a PM address from an eUICC of the terminal 201 to the terminal 201. The communication unit 605 acquires a PLMN ID list through RF scanning and transfers a PLMN ID list to the terminal 201. The controller 601 outputs the acquired PLMN ID list together with network provider information to the screen output unit 611, and the input unit 609 receives an input of information that selects a network provider wanting to subscribe from the user. The controller 601 controls to transfer a PLMN ID value corresponding to the selected network provider that receives an input from the user to an address server through the communication unit 605 and acquire a URL of a network provider corresponding to the PLMN ID.

According to an embodiment of the present invention, the controller 601 controls the terminal 201 to acquire a URL of network providers corresponding to the acquired PLMN ID list from the storage unit 607 of the terminal 201.

The controller 601 controls to transfer the eUICC ID to the address server through the communication unit 605 and controls the terminal 201 to acquire the PM address corresponding to the eUICC ID. The communication unit 605 searches for a network in which the controller 601 can access, and when the communication unit 605 acquires information for providing identification information of a eUICC to a network provider of a network selected by a user, the communication unit 605 transmits the acquired information to the network provider. The input unit 609 transfers a network provider selection input signal of the user and subscriber information input by the user to the controller 601. The controller 601 controls a network provider selection input signal of the user and subscriber information input by the user to be transferred to the network management server through the communication unit 605. The communication unit 605 transfers the eUICC ID to the network management server and additionally transfers the MSISDN and the PM address. When the user subscribes to the network, the screen output unit 611 outputs a User Interface (UI) of the terminal 201 and displays the UI on the screen of the terminal 201.

Figure 7:
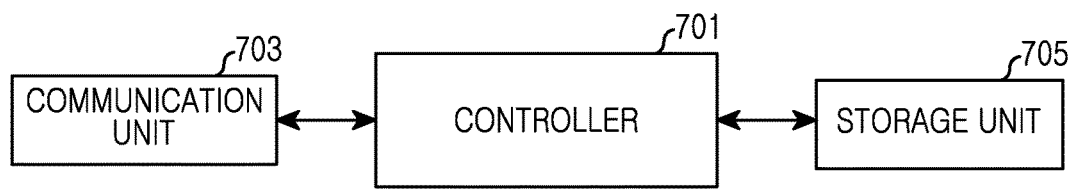
FIG. 7 is a block diagram illustrating a server device for a network subscription procedure in a wireless communication system according to an embodiment of the present invention.

FIG. 7 is a block diagram illustrating a server device for a network subscription procedure in a wireless communication system according to an embodiment of the present invention. A configuration of the server device of FIG. 7 may be applied to a network management server 207, a profile provider 209, or a PM 211.

Referring to FIG. 7, the server device includes a controller 701, a communication unit 703, and a storage unit 705.

The controller 701 controls an entire operation of the server device. The communication unit 703 processes a signal transmitted and received through a network for audio and data communication. The storage unit 705 may include a program storage unit that stores a program for controlling an operation of a network management server, a profile provider, and a PM and a data storage unit that stores data occurring while executing a program.

When the server device is a network management server 207, the controller 701 controls to acquire an eUICC ID from the terminal 201 through the communication unit 703 and to additionally acquire an MSISDN and a PM address, as needed, and controls the terminal 201 to subscribe to a network. The storage unit 705 stores the eUICC ID, the MSISDN, and the PM address. The communication unit 703 transmits the eUICC ID, the MSISDN, the PM address, and subscriber information to the profile provider and transmits a response message from the profile provider 209 to the terminal 201.

When the server device is a profile provider 209, the controller 701 controls to acquire an eUICC ID, an MSISDN, a PM address, subscriber information from the network management server 207 through the communication unit 703. The storage unit 705 stores the eUICC ID, the MSISDN, the PM address, and the subscriber information. The communication unit 703 transmits the eUICC ID and the MSISDN acquired from the network management server 207 to the PM 211 and transmits a response message from the PM 211 to the network a manager.

When the server device is a PM 211, the controller 701 controls to acquire an eUICC ID and an MSISDN from the profile provider 209 through the communication unit 703. The storage unit 705 stores the eUICC ID and the MSISDN. The controller 701 controls to transfer a response message to the profile provider 209 through the communication unit 703. The controller 701 receives a profile download request signal from the terminal 201 through the communication unit 703 and controls a security domain and a profile to be downloaded to the eUICC corresponding to the eUICC ID and the MSISDN.

According to the present invention, in a communication system, a list of network providers that can be subscribed in a nation or a region in which a user is located is determined on a screen of a terminal 201, when the user selects a network provider the user wants to subscribe to from the list, the screen is moved to a network provider subscription screen, and when the user completes subscription to a network, a profile that can use a communication service in which a corresponding network provider provides can be accurately automatically installed without an error in the terminal.

While the present invention has been particularly shown and described with reference to certain embodiments thereof, it will be understood by those skilled in the art that various changes in form and details may be made therein without departing from the scope and spirit of the present invention as defined by the appended claims and their equivalents.

What is claimed is:

1. A terminal in a wireless communication system, the terminal comprising:
a communication unit; and
a controller configured to:
determine, by scanning a radio frequency (RF), at least one network to which the terminal is accessible;
detect an input for selecting a network from among the determined at least one network;
identify address information of a subscription server for a network provider corresponding to the selected network; and
control the a communication unit to:
transmit identification information associated with an embedded universal integrated circuit card (eUICC) of the terminal to the subscription server operated by the network provider, based on the address information;
receive an acknowledgement message from the subscription server;
transmit a message for requesting a profile associated with the network provider to a profile management server; and
receive the requested profile from the profile management server.

2. The terminal of claim 1, wherein the controller is further configured to acquire public land mobile network identifiers (PLMN IDs) through the scanning of the RF.

3. The terminal of claim 2, wherein the controller is further configured to acquire information regarding uniform resource locator (URL) corresponding to a PLMN ID of the network provider-, from an address server or a memory of the terminal, and
wherein the information regarding the URL is used to subscribe for the network provider with the identification information associated with the eUICC.

4. The terminal of claim 3, wherein the controller is further configured to acquire an address of a the profile management server from the eUICC or the address server.

5. The terminal of claim 4, wherein the controller is further configured to access the URL through a web browser of the terminal and provide at least one of the identification information associated with the eUICC, identification information of the terminal, the address of the profile management server, and user subscription information from the eUICC, to the subscription server operated by the network provider.

6. The terminal of claim 1, wherein the scanning of the RF is performed to determine the network provider to which the terminal initially subscribes.

7. A subscription server operated by a network provider in a wireless communication system, the subscription server comprising:
a communication unit; and
a controller configured to control the communication unit to:
receive, from a terminal, identification information associated with an embedded universal integrated circuit card (eUICC) of the terminal;
transmit, to a profile providing server, the identification information associated with the eUICC for the terminal to receive a profile associated with the network provider via a profile management server from the profile providing server;
receive an acknowledgement message from the profile providing server; and
transmit, to the terminal, an acknowledgement message, wherein the network provider corresponds to a network selected from among at least one network to which the terminal is accessible, according to a user input, and
wherein the at least one network is determined by scanning a radio frequency (RF) in the terminal.

8. A profile providing server in a wireless communication system, the server comprising:
a communication unit; and
a controller configured to control the communication unit to:

receive, from a subscription server operated by a network provider, identification information associated with an embedded universal integrated circuit card (eUICC) of a terminal; and transmit, to a profile management server, the identification information associated with the eUICC of the terminal and a profile associated with the network provider to be transmitted to the terminal, wherein the network provider corresponds to a network selected from among at least one network to which the terminal is accessible, according to a user input, and wherein the at least one network is determined by scanning a radio frequency (RF) in the terminal.

9. A profile management server in a wireless communication system, the apparatus comprising:

a communication unit; and a controller configured to control the communication unit to:

receive, from a profile providing server, identification information associated with an embedded universal integrated circuit card (eUICC) of a terminal and a profile associated with a network provider;

transmit an acknowledgment to the profile providing server;

receive a message for requesting the profile associated with the network provider from the terminal;

transmit the profile associated with the network provider to the terminal; and transmit the profile associated with the network provider to the eUICC through a secure channel, wherein the network provider corresponds to a network selected from among at least one network to which the terminal is accessible, according to a user input, and wherein the at least one network is determined by scanning a radio frequency (RF) in the terminal.

10. A method for operating a terminal in a wireless communication system, the method comprising:

determining, by scanning a radio frequency (RF), at least one network to which the terminal is accessible;

detecting an input for selecting a network from among the determined at least one network;

identifying address information of a subscription server for a network provider corresponding to the selected network;

transmitting identification information associated with an embedded universal integrated circuit card (eUICC) of the terminal to the subscription server operated by the network provider, based on the address information;

receiving an acknowledgement message from the subscription server;

transmitting a message for requesting a profile associated with the network provider to a profile management server; and receiving the requested profile from the profile management server.

11. The method of claim 10, wherein a controller acquires public land mobile network identifiers (PLMN IDs) through the scanning of the RF.

12. The method of claim 11, further comprising:

acquiring information regarding uniform resource locator (URL) corresponding to a PLMN ID of the network provider, from an address server or a memory of the terminal, wherein the information regarding the URL is used to subscribe for the network provider with the identification information associated with the eUICC.

13. The method of claim 12, further comprising acquiring an address of the profile management server from the eUICC or the address server.

14. The method of claim 13, further comprising:

accessing the URL through a web browser of the terminal; and providing at least one of the identification information associated with the eUICC acquired from the eUICC, identification information of the terminal, the address of the profile management server, and user subscription information to the subscription server operated by the network provider.

15. The method of claim 10, wherein the scanning of the RF is performed to determine the network provider to which the terminal initially subscribes.

16. A method for operating a subscription server operated by a network provider in a wireless communication system, the method comprising:

receiving, from a terminal, identification information associated with an embedded universal integrated circuit card (eUICC) of the terminal;

transmitting, to a profile providing server, the identification information associated with the eUICC for the terminal to receive a profile associated with the network provider via a profile management server from the profile providing server;

receiving an acknowledgement message from the profile providing server; and transmitting, to the terminal, an acknowledgement message, wherein the network provider corresponds to a network selected from among at least one network to which the terminal is accessible, according to a user input, and wherein the at least one network is determined by scanning a radio frequency (RF) in the terminal.

17. A method for operating a profile providing server in a wireless communication system, the method comprising:

receiving, from a subscription server operated by a network provider, identification information associated with an embedded universal integrated circuit card (eUICC) of a terminal; and transmitting, to a profile management server, the identification information associated with the eUICC of the terminal and a profile associated with the network provider to be transmitted to the terminal, wherein the network provider corresponds to a network selected from among at least one network to which the terminal is accessible, according to a user input, and wherein the at least one network is determined by scanning a radio frequency (RF) in the terminal.

18. A method for operating a profile management server in a wireless communication system, the method comprising:

receiving, from a profile providing server, identification information associated with an embedded universal integrated circuit card (eUICC) of a terminal, and a profile associated with a network provider;

transmitting, to the profile providing server, an acknowledgement;

receiving, from the terminal, a message for requesting the profile associated with the network provider; and transmitting, to the terminal, the profile associated with the network provider through a secure channel, wherein the network provider corresponds to a network selected from among at least one network to which the terminal is accessible, according to a user input, and
wherein the at least one network is determined by scanning a radio frequency (RF) in the terminal.

\* \* \* \* \*